(12) United States Patent
Bliley et al.

(10) Patent No.: US 7,515,393 B2
(45) Date of Patent: Apr. 7, 2009

(54) VOLTAGE REGULATOR

(75) Inventors: Paul D. Bliley, Vancouver, WA (US);
Bill Eaton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 700 days.

(21) Appl. No.: 10/841,651

(22) Filed: May 6, 2004

(65) Prior Publication Data
US 2005/0248894 A1  Nov. 10, 2005

(51) Int. Cl.
*H02M 3/156* (2006.01)
*H02M 3/335* (2006.01)

(52) U.S. Cl. .............. 361/92; 363/21.1; 363/21.11; 363/21.18; 363/26

(58) Field of Classification Search ............ 361/92; 363/21.1, 21.11, 21.18, 26
See application file for complete search history.

(56) References Cited

U.S. PATENT DOCUMENTS

| | | | | |
|---|---|---|---|---|
| 4,390,831 A | * | 6/1983 | Byrd et al. | 323/240 |
| 4,598,351 A | | 7/1986 | Fair et al. | |
| 4,806,842 A | | 2/1989 | Bittner | |
| 5,138,513 A | * | 8/1992 | Weinstein | 361/2 |
| 5,359,281 A | | 10/1994 | Barrow et al. | |
| 5,367,247 A | | 11/1994 | Blocher et al. | |
| 5,461,301 A | | 10/1995 | Truong | |
| 5,583,398 A | * | 12/1996 | Dellamano et al. | 315/247 |
| 5,625,279 A | * | 4/1997 | Rice et al. | 323/283 |
| 5,680,016 A | * | 10/1997 | Valcke | 315/302 |
| 5,917,313 A | | 6/1999 | Callahan, Jr. | |
| 6,038,155 A | | 3/2000 | Pelly | |
| 6,040,661 A | * | 3/2000 | Bogdan | 315/224 |
| 6,100,678 A | | 8/2000 | Hobrecht | |
| 6,272,025 B1 | * | 8/2001 | Riggio et al. | 363/24 |
| 6,316,926 B1 | * | 11/2001 | Savo et al. | 323/282 |
| 6,429,709 B1 | * | 8/2002 | Hall et al. | 327/175 |
| 6,819,027 B2 | * | 11/2004 | Saraf | 310/316.01 |
| 6,906,499 B2 | * | 6/2005 | Hussein et al. | 323/222 |
| 7,049,758 B2 | * | 5/2006 | Weyhrauch et al. | 315/209 SC |
| 2002/0163371 A1 | | 11/2002 | Hall et al. | |
| 2003/0020442 A1 | | 1/2003 | Hwang | |
| 2003/0071586 A1 | | 4/2003 | Lin et al. | |
| 2006/0175064 A1 | * | 8/2006 | Yuratich | 166/381 |

FOREIGN PATENT DOCUMENTS

| | | |
|---|---|---|
| JP | 03-235695 | * 10/1991 |
| JP | 05-219785 | *  8/1993 |

* cited by examiner

*Primary Examiner*—Stephen W Jackson
*Assistant Examiner*—Zeev Kitov

(57) ABSTRACT

According to one embodiment, a voltage regulator includes a switch configured to selectively conduct electrical energy according to a signal, and circuitry configured to provide the signal to implement a soft start procedure comprising varying frequency and duty cycle of the signal.

59 Claims, 4 Drawing Sheets

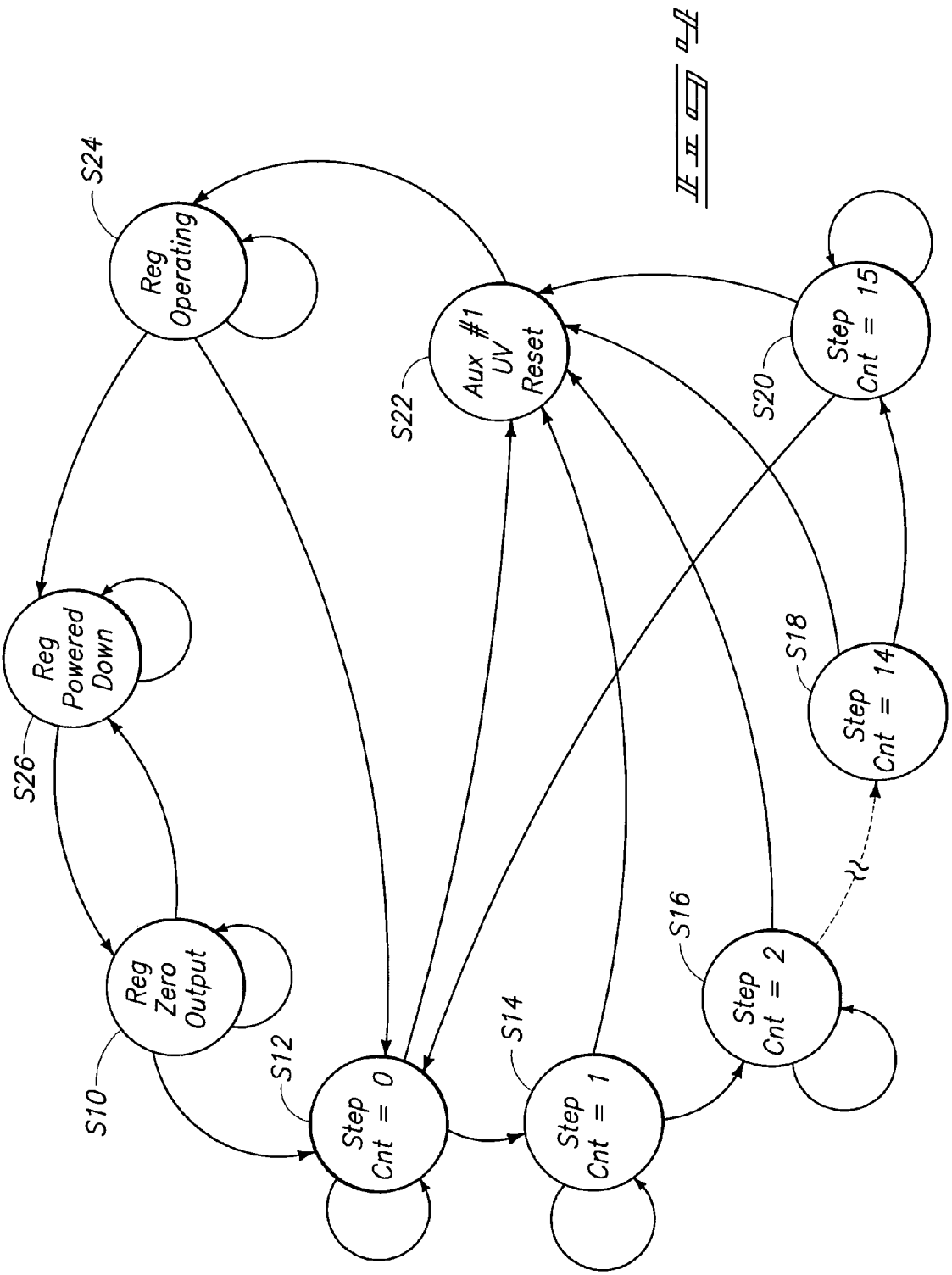

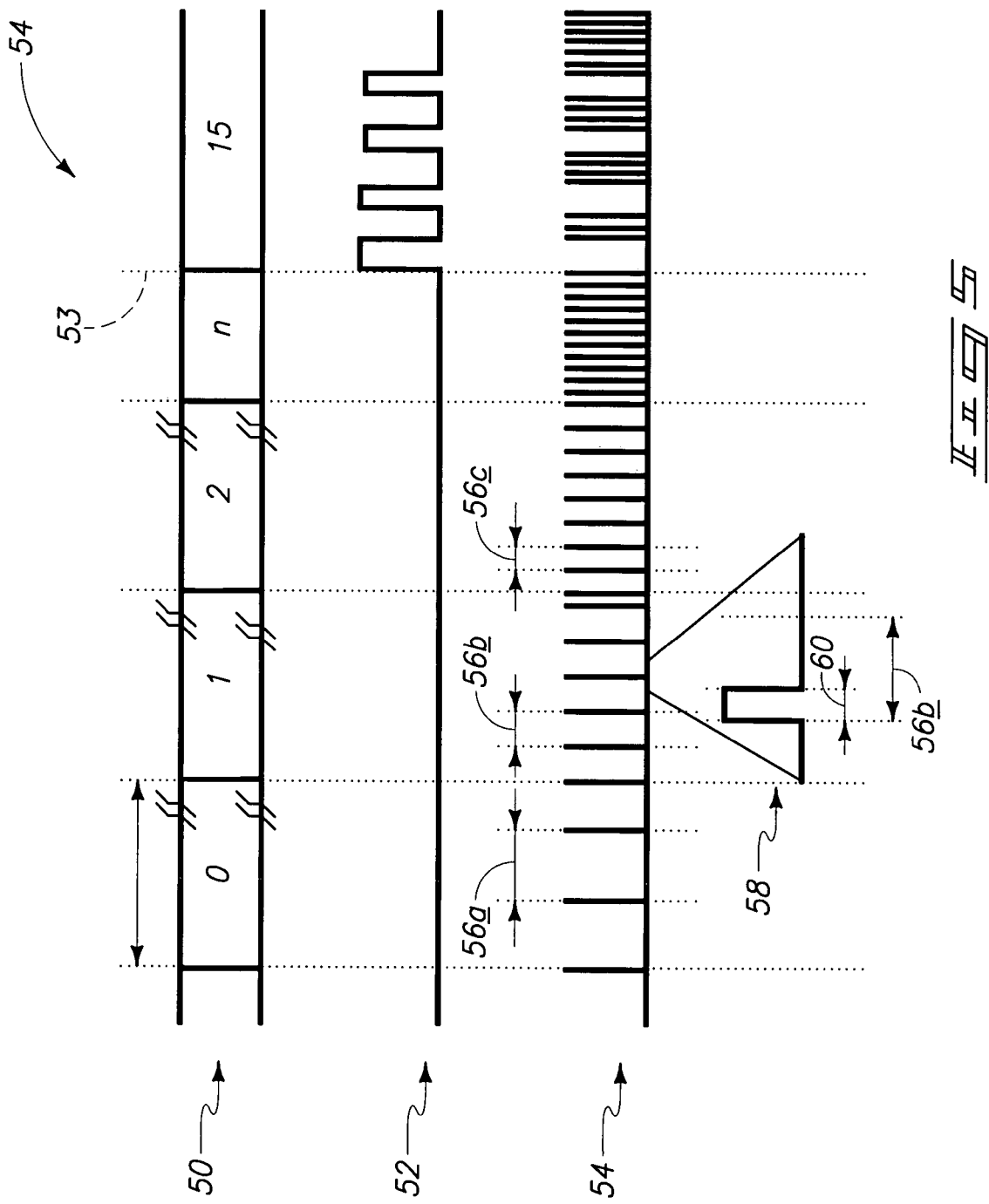

VOLTAGE REGULATOR

BACKGROUND

Start-up operations of switching voltage regulators may stress electrical components. For example, relatively large currents may be generated during transitions from an off state to an operable, regulating state of the voltage regulators. The large currents may stress electrical components to their maximum, and in some instances, lead to premature failure.

DESCRIPTION OF THE DRAWINGS

FIG. 4 is a state diagram illustrating a plurality of states of a voltage regulator according to one embodiment.

FIG. 5 is a timing diagram illustrating exemplary operations of a voltage regulator according to one embodiment.

DETAILED DESCRIPTION

As described below, apparatus and methods are disclosed according to at least one embodiment for providing a soft start function or procedure by modulating frequency and pulse width of an output control switch of a voltage regulator. A plurality of discrete steps may be used to ramp the voltage from off to fully on or other desired target value in one embodiment.

Figure 1:
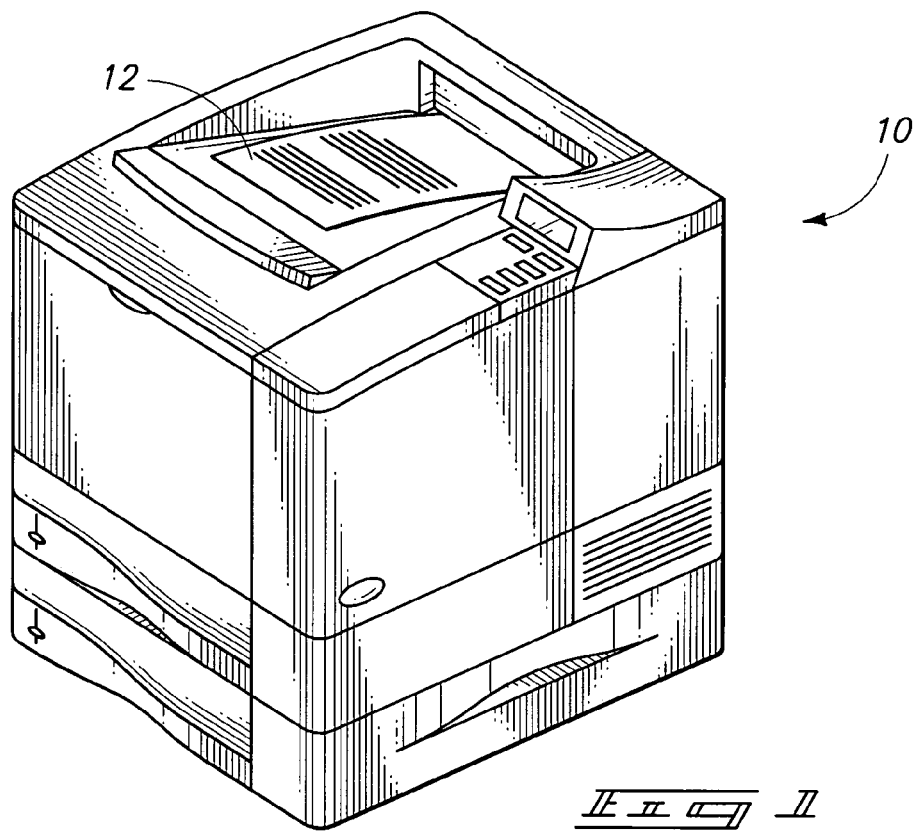
FIG. 1 is an isometric view of an imaging device according to one embodiment.

Referring to FIG. 1, an exemplary imaging device 10 is shown. Imaging device 10 is configured to generate images upon output media 12, such as sheets of paper, transparencies, envelopes, etc. Imaging device 10 may comprise a printer, copier, multiple function peripheral, facsimile machine, or any other device configured to generate images, for example by providing a marking agent (e.g., toner, ink, etc.), upon media. Imaging device 10 may comprise a plurality of electrical loads (not shown in FIG. 1). The electrical loads may utilize electrical energy of different voltages. At least one embodiment described below comprises a voltage regulator configured to provide desired regulated electrical energy to one or more of the loads.

Figure 2:
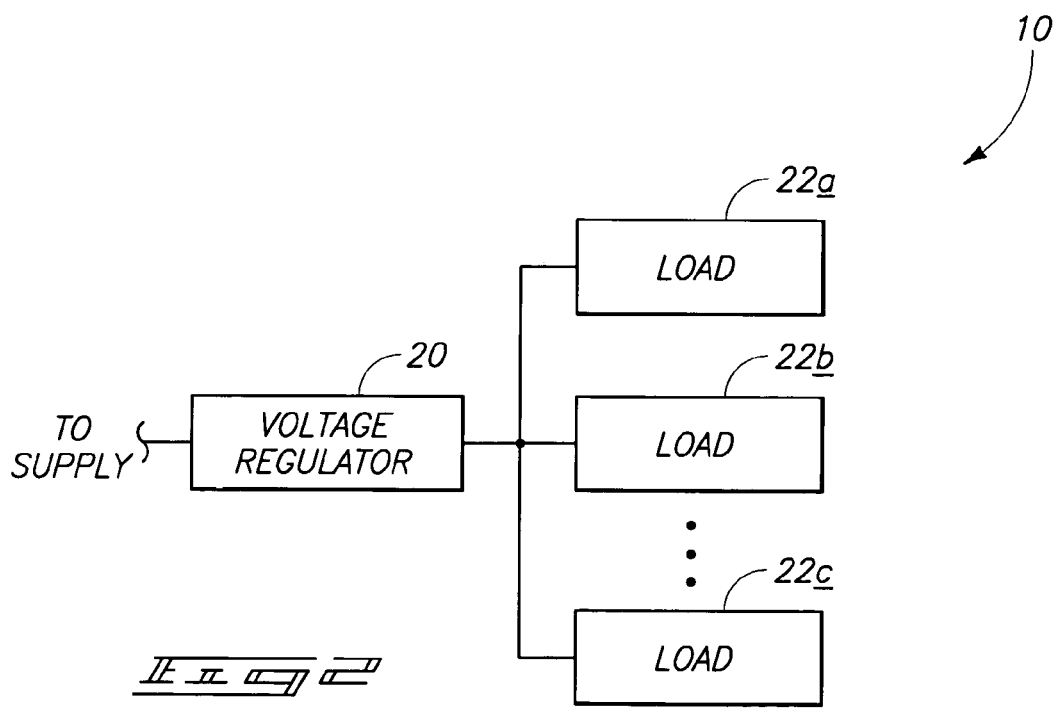
FIG. 2 is a functional block diagram of an imaging device according to one embodiment.

Referring to FIG. 2, exemplary components for one embodiment of imaging device 10 are shown. The illustrated imaging device 10 includes a voltage regulator 20 and a plurality of electrical loads 22a-22c. Exemplary electrical loads of imaging device 12 include logic circuitry, fans, motors, etc.

Voltage regulator 20 is configured to connect with a supply of electrical energy in the depicted embodiment. In one embodiment, the supplied electrical energy comprises direct current electrical energy having an initial or input voltage (e.g., 32 Volts). One or more of loads 22a-22c may use electrical energy regulated to respective different voltages in one embodiment (e.g., 3.3. Volts for a load comprising logic circuitry, 5 Volts for a load comprising a sensor, and 12 Volts for a load comprising a scanner light bulb, etc). Voltage regulator 20 is configured to convert the direct current voltage of the input or initial electrical energy to electrical energy of one or more different direct current voltage corresponding to the configuration of loads 22a-22c in one embodiment. In other embodiments, a plurality of regulators 20 may be utilized to provide electrical energy of different respective voltages.

Figure 3:
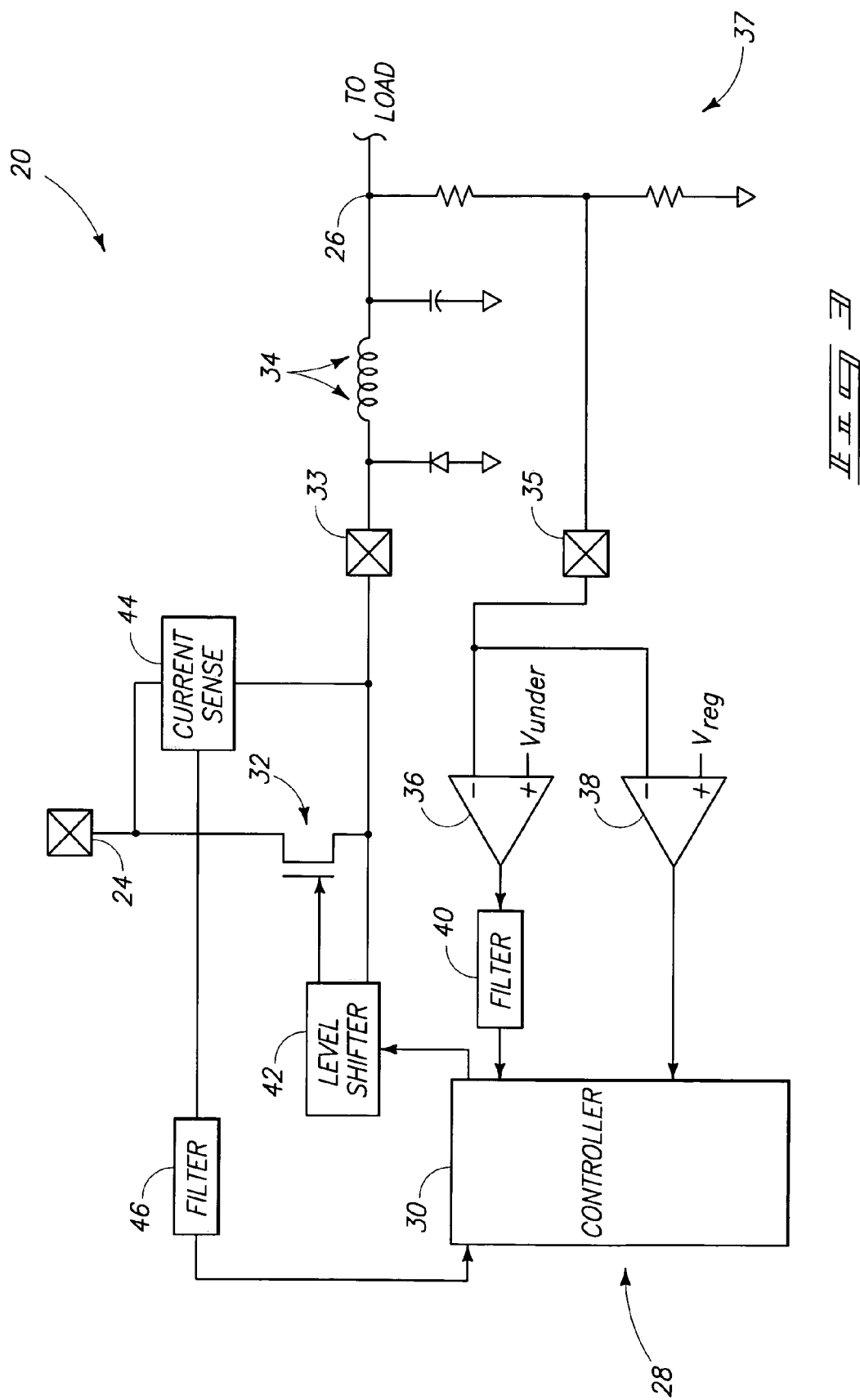
FIG. 3 is a schematic representation of a voltage regulator according to one embodiment.

Referring to FIG. 3, an exemplary arrangement of voltage regulator 20 is shown. The depicted voltage regulator 20 is configured to output electrical energy of a single direct current voltage for use by one or more load 22a-22c. Voltage regulator 20 may be arranged to provide a plurality of direct current voltages in other embodiments. As shown, the voltage regulator 20 in one embodiment, includes an input 24, an output 26, processing circuitry 28, switch 32 and voltage conditioning circuitry 34 as well as other components described below.

Input 24 is configured to receive direct current electrical energy from a supply. The received electrical energy may be supplied by a common alternating current electrical energy source and rectified, supplied by batteries, or otherwise accessed. The received electrical energy is supplied at an initial voltage. According to an exemplary embodiment wherein voltage regulator 20 is embodied within imaging device 10, electrical energy may be supplied to input 24 at a voltage of 32 Volts. Other embodiments can operate at any number of other initial voltages.

Output 26 is configured to couple with and provide direct current electrical energy to one or more load 22a-22c (shown in FIG. 2). Output 26 provides the electrical energy regulated to another voltage different than the voltage of the supplied electrical energy received at input 24.

Processing circuitry 28 may comprise circuitry configured to implement desired programming in one embodiment. For example, the processing circuitry 28 may be implemented as a processor or other structure configured to execute executable instructions including, for example, software and/or firmware instructions. Other exemplary embodiments of processing circuitry 28 may include or comprise hardware logic, PGA, FPGA, ASIC, state machines and/or other structures. These examples of processing circuitry 28 are for illustration and other configurations are possible. According to some exemplary embodiments, processing circuitry 28 may control operations of voltage regulator 20 and be referred to as a controller 30 described below.

Switch 32 is configured to selectively conduct electrical energy intermediate input 24 and output 26 to implement voltage regulation operations. In one embodiment, switch 32 is implemented as a n-channel field effect transistor. In the described embodiment, circuitry of voltage regulator 20 may provide a signal to control switch 32 to implement a soft start procedure. The circuitry may vary the duty cycle and/or frequency of the signal (e.g., pulse width modulated signal) in one exemplary arrangement. In a more specific example, processing circuitry 28 comprising controller 30 is configured to monitor operations of voltage regulator 20 and/or imaging device 10 and to generate a pulse width modulation control signal to control switch 32 and voltage regulation operations. The pulse width modulation control signal may be applied to level shifter 42 to provide a correct voltage for controlling switch 32. Additional details regarding exemplary monitoring and control functionality are described below. Switch 32 configured as an n-channel field effect transistor is for illustration. Other configurations are possible.

Conditioning circuitry 34 may comprise a plurality of discrete components configured to implement the voltage regulation operations in conjunction with switching of switch 32. In the illustrated embodiment, power conditioning circuitry 34 comprises a diode, inductor and capacitor. Other arrangements of power conditioning circuitry 34 are possible.

According to one embodiment, voltage regulator 20 is configured to operate in a plurality of modes. Upon receipt of an indication to initiate voltage regulation operations (e.g., upon power-up, following sleep mode operation, following a fault, or other condition), voltage regulator 20 may enter a soft start mode of operation to reduce or avoid the generation of large currents. Following appropriate voltage regulation of the electrical energy, the voltage regulator 20 may switch from the soft start mode of operation to a voltage regulation mode of operation.

In one embodiment, voltage regulator 20 is configured to provide the outputted electrical energy at output 26 in the form of a substantially linear ramp from zero to the desired regulated voltage during the soft start mode of operation. According to one implementation, controller 30 is configured to modulate or vary one or more parameter of the pulse width modulation control signal during the soft start mode of operation. To provide a substantially linear ramping output in one exemplary implementation, voltage regulator 20 may ramp the frequency and duty cycle of the pulse width modulation control signal to desired maximum or other values.

For example, controller 30 may adjust or vary the frequency and the duty cycle of the pulse width modulation control signal according to a plurality of discrete ordered steps in one implementation. The steps may have individual respective frequency and duty cycle values to provide a desired frequency and/or duty cycle of the pulse width modulation control signal. The steps may be arranged in a sequence to provide an ordered adjustment of the frequency and/or duty cycle. Further, the values may be selected to configure the pulse width modulation control signal to provide the substantially linear increase of the voltage from zero to the desired regulated output voltage. In one embodiment, the values may be internally stored as look up tables or other configuration within storage circuitry of processing circuitry 28 or other external storage circuitry (not shown). The storage circuitry may be configured to store the desired frequency and duty cycle values as well as electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment.

During soft start operations, controller 30 is configured to monitor the voltage outputted from voltage regulator 20 to determine if regulation has been obtained. If voltage regulation has been obtained, the controller 30 may cease the soft start mode of operation and proceed to the voltage regulation mode of operation. If voltage regulation has not been obtained after a predetermined period of time for a respective step, the controller 30 may proceed to a subsequent step of the sequence to access new frequency and/or duty cycle values to modify the pulse width modulation control signal in an effort to achieve voltage regulation. The new values may result in both of frequency and duty cycle being increased, maintaining one of the frequency and duty cycle the same while increasing the other, decreasing one of the frequency and duty cycle the same while increasing the other, or maintaining one of the frequency and duty cycle the same while decreasing the other. Other implementations are possible.

According to the exemplary described embodiment, voltage regulator 20 further comprises an intermediate voltage node 33 coupled intermediate switch 32 and power conditioning circuitry 34, and a feedback voltage node 35 coupled with output 26 via a voltage divider 37 implemented as a resistive divider in one example. Node 35 is further coupled with an undervoltage comparator 36 and a voltage loop comparator 38 to provide voltage monitoring functionality as described below. Other configurations for implementing voltage monitoring operations are possible.

The output of voltage loop comparator 38 is arranged to indicate to controller 30 whether voltage regulation has been achieved. For example, voltage loop comparator 38 is configured to compare the voltage of node 35 with a voltage regulation threshold (Vreg). If the output of comparator 38 indicates that voltage regulation has been achieved (e.g., the output voltage is within a desired range), the controller 30 may switch from the soft start mode of operation to the voltage regulation mode of operation.

During the voltage regulation mode of operation, the pulse width modulation control signal may be ceased (also ceasing switching) until the voltage of the feedback voltage node 35 as monitored by comparator 38 indicates the voltage at output 26 of the voltage regulator 20 is outside of the desired regulated voltage range. Thereafter, the controller 30 may again apply the pulse width modulation control signal to switch 32 to implement switching to return the voltage at output 26 to the desired range of voltage regulation. The frequency and the duty cycle of the control signal may be fixed during one embodiment of the voltage regulation mode of operation. Accordingly, in one embodiment, varying of the frequency and duty cycle of the pulse width modulation control signal is disabled or terminated responsive to the ceasing of the soft start mode of operation and initiation of the voltage regulation mode of operation.

The output of undervoltage comparator 36 may be utilized to indicate an undervoltage condition. For example, comparator 36 may compare the voltage of node 35 with respect to a undervoltage threshold (Vunder). In one embodiment, controller 30 may reinitiate the soft start procedure responsive to an undervoltage condition being indicated during the voltage regulation mode of operation. An example would be where Vreg=1.0V and Vunder=0.75V. If the voltage at node 26, which gets scaled by the voltage divider 37, falls so that the voltage at node 35 goes below the threshold of 1.0V, the loop comparator 38 will provide a signal to controller 28 to turn on the power switch 32. This loop will keep the voltage at node 26 in regulation. If the voltage at node 35 falls below 0.75V, the undervoltage comparator 36 will provide a signal to controller 28 to go into a soft start. The output of comparator 36 may be applied to filter 40 to attenuate glitches before the output is received by controller 30. Filter 40 may provide a delay (e.g., 5-6 microseconds) in one embodiment to attenuate the glitches. However, the delay imposed upon the output of comparator 36 by filter 40 may also result in looping by controller 30 inasmuch as the output of comparator 38 may indicate voltage regulation has been achieved but the delayed output of comparator 36 may still indicate the presence of an undervoltage condition resulting in the controller 30 again entering the soft start mode of operation. Accordingly, in one embodiment, the controller 30 may temporarily cease monitoring of undervoltage conditions following an indication of voltage regulation to avoid the looping between the soft start and voltage regulation modes of operation. In one embodiment, the filter 40 may be embodied as one or more flip-flop and controller 30 may reset the flip-flops (e.g., provide a logic 0) upon a voltage regulation indication being provided by comparator 38 to temporarily disable the undervoltage monitoring by controller 30 via comparator 36. Other embodiments are possible.

In one arrangement, a maximum duty cycle of voltage regulator 20 is programmable permitting the voltage regulator 20 to operate over a wide output voltage range. For example, the voltage regulator 20 may be programmed via a serial bus (not shown) in one embodiment once the regulator is out of reset.

In one embodiment, cycle-by-cycle current limit functions may be maintained during the soft start procedure. For example, current sense circuit 44 may monitor the current being conducted by switch 32. In the described embodiment, the current sense circuit 44 provides an output signal to filter 46 which operates to attenuate noise or glitches (e.g., filter 46 may provide a 5-6 microsecond delay). The output of filter 46 is provided to controller 28. If the output of filter 46 indicates that a threshold is exceeded, controller 28 may alter the operation of switch 32 (e.g., turn off the switch or reduce the duty cycle of the control signal on a per cycle basis) to avoid or reduce conduction of excessive currents. Excessive currents are defined in one arrangement as currents which are in excess of twice the rated output current.

Exemplary values of components in FIG. 3 for providing a voltage at output 26 of 3.3 Volts are: inductor=220 μH, capacitor=330 μF, resistor coupled with ground=1 kOhms, resistor coupled with output 26=2.3 kOhms and diode=2 Amps. Components of other values may be used in other embodiments (e.g., to provide different voltages at output 26).

Referring to FIG. 4, a sequence of steps of an exemplary soft start mode of operation are described with respect to a state diagram. Other implementations are possible including more, less or alternative states.

Initially at state S10, no voltage regulation or switching of switch 32 is provided. State S10 may be maintained until the controller 30 receives operational energy or the soft start mode of operation is otherwise initiated. Voltage regulator 20 may provide a tristate output at state S10.

Following instruction to initiate voltage regulation operations, states S12-S20 are sequentially entered to provide soft start functionality in one embodiment. In the exemplary illustrated embodiment, states S12-S20 may correspond to respective steps having associated different frequency and/or duty cycle values (only a few steps are shown in FIG. 4). During individual ones of states S12-S20, respective values are used by controller 30 for controlling the frequency and duty cycle of the control signal applied to switch 32. The values may be retrieved from a look up table in one embodiment. Individual ones of states S12-S20 may be maintained until voltage regulation is indicated by comparator 38 or a predetermined clock count (e.g., 512 cycles of an 11.25 MHz/64 clock in one embodiment) has been counted. If voltage regulation is achieved, the state proceeds to state S22. Regulation may be achieved at any one of the states S12-S20 depending upon a target selected output voltage, external load, external regulator components, or other factors.

If voltage regulation is not achieved and a timeout of the counter occurs for the respective state, the voltage regulator 20 may proceed to the next state of the soft start sequence. If voltage regulation is not achieved and a timeout of the counter occurs for state S20, the voltage regulator 20 may return to state S12 to again attempt voltage regulation during another soft start procedure. The failure to reach regulation by the step of state S15 may indicate a short on the output of the voltage regulator 20 and the procedure loops back to state S12 to the zero count position to avoid coming out of soft start in a shorted situation.

At state S22 responsive to voltage regulation being indicated, the controller 30 operates to reset filter 40 to temporarily disable the undervoltage monitoring avoiding the looping issue discussed previously.

Following reset of filter 40, the voltage regulator 20 proceeds to state S24 wherein the voltage regulation mode of operation is implemented. The controller 30 may retrieve fixed frequency and duty cycle values during state S24 to provide the pulse width modulation signal having a constant frequency and duty cycle during voltage regulation.

If an undervoltage condition is detected during state S24, the soft start procedure may be reinitiated at state S12. If a power off or other indication is received to exit voltage regulation, the voltage regulator 20 proceeds to state S26 to cease switching, provide a tristate output, and to monitor for an indication to resume voltage regulation operations. State S26 may correspond to a sleep state of imaging device 10 in one embodiment.

Referring to Table A-Table C, exemplary frequency and duty cycle values are provided. In one exemplary embodiment, the voltage regulator 20 has an output voltage range of 1-16 Volts. Other embodiments can operate over different output voltage ranges. Controller 30 limits the maximum duty cycle and frequency of voltage regulator 20 as regulation is started or initiated. As the duty cycle and/or frequency of the pulse modulation signal are increased, the voltage of the electrical energy at output 26 also increases eventually reaching the desired output voltage. As mentioned above, once regulation is achieved, the voltage regulator 20 may enter the voltage regulation mode of operation.

Tables A-C correspond to three different soft start, pulse width and frequency ranges to cover a regulator output voltage range of 16 Volts in the described example. Table A may cover soft start, pulse width and frequency ranges for a voltage range of 1-5 Volts, Table B may cover soft start, pulse width and frequency ranges for a voltage range of 6-12 Volts, and Table C may cover soft start, pulse width and frequency ranges for a voltage range of 12-16 Volts in the example. For example, during an initial execution of the soft start procedure, Table A may be accessed. If regulation is not achieved, Tables B and C (if appropriate) may be accessed to provide frequency and duty cycle values for one or more subsequent execution of the soft start procedure.

TABLE A

| Step Cnt | Cycle Delay Value | PWL Value | Target Duty Cycle | Target Frequency (Maximum) |
|---|---|---|---|---|
| 0 | 16 | 18 | 1.8% | 11 KHz |
| 1 | 8 | 18 | 3.5% | 22 KHz |
| 2 | 4 | 14 | 5.5% | 44 KHz |
| 3 | 4 | 18 | 7.0% | 44 KHz |
| 4 | 4 | 22 | 8.6% | 44 KHz |
| 5 | 4 | 27 | 10.6% | 44 KHz |
| 6 | 2 | 16 | 12.5% | 88 KHz |
| 7 | 2 | 18 | 14.1% | 88 KHz |
| 8 | 2 | 20 | 15.6% | 88 KHz |
| 9 | 2 | 22 | 17.2% | 88 KHz |
| 10 | 2 | 25 | 19.5% | 88 KHz |
| 11 | 2 | 28 | 21.9% | 88 KHz |
| 12 | 2 | 30 | 23.4% | 88 KHz |
| 13 | 2 | 32 | 25.0% | 88 KHz |
| 14 | 2 | 34 | 26.6% | 88 KHz |
| 15 | 1 | 18 | 28.1% | 176 KHz |

TABLE B

| Step Cnt | Cycle Delay Value | Pwl Value | Target Duty Cycle | Target Frequency (Maximum) |
|---|---|---|---|---|
| 0 | 16 | 40 | 3.9% | 11 KHz |
| 1 | 8 | 40 | 7.8% | 22 KHz |
| 2 | 4 | 30 | 11.7% | 44 KHz |
| 3 | 4 | 40 | 15.6% | 44 KHz |
| 4 | 4 | 50 | 19.5% | 44 KHz |
| 5 | 2 | 30 | 23.4% | 88 KHz |
| 6 | 2 | 36 | 28.1% | 88 KHz |
| 7 | 2 | 40 | 31.3% | 88 KHz |

TABLE B-continued

| Step Cnt | Cycle Delay Value | Pwl Value | Target Duty Cycle | Target Frequency (Maximum) |
|---|---|---|---|---|
| 8 | 2 | 46 | 35.9% | 88 KHz |
| 9 | 2 | 50 | 39.1% | 88 KHz |
| 10 | 1 | 28 | 43.8% | 176 KHz |
| 11 | 1 | 30 | 46.9% | 176 KHz |
| 12 | 1 | 33 | 51.6% | 176 KHz |
| 13 | 1 | 36 | 56.3% | 176 KHz |
| 14 | 1 | 38 | 59.4% | 176 KHz |
| 15 | 1 | 42 | 65.6% | 176 KHz |

TABLE C

| Step Cnt | Cycle Delay Value | PWL Value | Target Duty Cycle | Target Frequency (Maximum) |
|---|---|---|---|---|
| 0 | 16 | 54 | 5.3% | 11 KHz |
| 1 | 8 | 54 | 10.5% | 22 KHz |
| 2 | 4 | 41 | 16.0% | 44 KHz |
| 3 | 4 | 54 | 21.1% | 44 KHz |
| 4 | 2 | 34 | 26.6% | 88 KHz |
| 5 | 2 | 40 | 31.3% | 88 KHz |
| 6 | 2 | 47 | 36.7% | 88 KHz |
| 7 | 2 | 54 | 42.2% | 88 KHz |
| 8 | 1 | 30 | 46.9% | 176 KHz |
| 9 | 1 | 34 | 53.1% | 176 KHz |
| 10 | 1 | 37 | 57.8% | 176 KHz |
| 11 | 1 | 41 | 64.1% | 176 KHz |
| 12 | 1 | 44 | 68.8% | 176 KHz |
| 13 | 1 | 48 | 75.0% | 176 KHz |
| 14 | 1 | 51 | 79.7% | 176 KHz |
| 15 | 1 | 55 | 85.9% | 176 KHz |

The Cycle Delay Value specifies how often controller 30 generates a pulse of the control signal for each step, thus determining the switching frequency in one embodiment. For example, the Cycle Delay Value of 16 for Step Cnt=0 means that a pulse will be generated for every 16 regulator clock events in one example. Therefore, the actual regulator switching frequency in Step Cnt=0 is for an internal clock of 11.25 MHZ (11.25 MHz/64)*(1/16)=11 KHz. The PWL Value controls the pulse width of the switching regulator's "On" time for each Step Cnt. The "On" time pulse is determined by multiplying the PWL Value by the time period of an internal (high speed) clock of controller 30. The result being that the PWL Value determines the switching "On" time duty cycle in the described example.

According to this described implementation, the number of pulses and/or pulse widths of individual steps may be varied. The duty cycle may be increased from one step to another or may be decreased as shown in the example values of the Tables. The combination of varying the rate at which the pulses occur and the varying the "On" time pulse width create a generally linear curve for the regulator output voltage start-up ramp described according to one embodiment.

Referring to FIG. 5, an exemplary timing diagram of soft start operations are described according to one embodiment. The steps of an exemplary soft start procedure are shown in line 50. Individual ones of the steps are 512 clock cycles in duration as counted by the controller 30 in the depicted example.

The output of the voltage loop comparator 38 is shown in line 52. In the depicted example, regulation is shown at a moment in time 53.

Line 54 depicts the pulse width modulation control signal applied to switch 32. The frequency and/or duty cycle is varied during the sequence of steps. In the illustrated example, the frequency of the pulses is shown to increase during the progression through the steps as represented by the decreasing periods 56*a*, 56*b*, and 56*c*. One exemplary pulse 58 is shown having an on time 60 with respect to the period 56*b*. The duty cycle may remain constant for the pulses or be varied between different pulses (not shown FIG. 5), for example, pulses of different step counts may have different duty cycles in one embodiment. As illustrated in line 54 after moment in time 53, switching occurs responsive to the output of voltage loop comparator 38 indicating out of voltage range occurrences.

According to one embodiment, the switching frequency and the maximum duty cycle of voltage regulator 20 may be ramped from zero to maximum values to avoid the presence of large currents during start-up. The output of the voltage regulator follows the duty cycle limit ramp producing a controlled voltage ramp at start-up reducing or avoiding overstressing of electronic parts at start-up and reducing failure rate in one embodiment.

At least one embodiment provides voltage regulator 20 having a robust design and which maintains peak currents at start-up at relatively low levels extending the life of the components. Further, in some arrangements, a plurality of voltage regulators 20 may be implemented using a common controller integrated circuit. Issues regarding the provision of multiple voltages from one ramp at different rates and faults occurring on the output of the voltage regulator are resolved. For example, at least one embodiment of the disclosed soft start procedure enables individual ones of the regulators to ramp up at approximately the same rate. This may be advantageous in arrangements wherein load digital integrated circuits use different voltages inasmuch as the simultaneous ramping of the different voltages from the regulators may avoid unexpected or excessive voltage deltas which may result in shorts or other damaging events. Further, at least one embodiment of voltage regulator 20 is more robust to faults occurring on an output inasmuch as faults on the output will not damage controller 30 and the average current delivered to a fault may be relatively low thereby improving the safety of the regulator.

The protection sought is not to be limited to the disclosed embodiments, which are given by way of example only, but instead is to be limited only by the scope of the appended claims.

What is claimed is:

1. A voltage regulator comprising:
 a switch configured to selectively conduct electrical energy according to a signal; and
 circuitry configured to provide the signal to implement a soft start procedure comprising varying frequency and duty cycle of the signal.

2. The voltage regulator of claim 1 wherein the circuitry comprises a processor.

3. The voltage regulator of claim 1 wherein the signal comprises a pulse width modulation signal.

4. The voltage regulator of claim 1 wherein the circuitry is configured to implement voltage regulation.

5. The voltage regulator of claim 1 wherein the circuitry is configured to monitor an output voltage and to terminate the varying of the frequency and duty cycle of the signal of the soft start procedure responsive to the output voltage being within a desired range.

6. The voltage regulator of claim 5 wherein the circuitry is configured to vary the frequency and the duty cycle according to a plurality of discrete steps, and to sequentially proceed through the discrete steps responsive to the output voltage not being within the desired range.

7. The voltage regulator of claim 6 wherein the sequentially proceeding comprises, for at least one of the steps, increasing one of the frequency and the duty cycle and decreasing the other of the frequency and the duty cycle.

8. The voltage regulator of claim 5 wherein the circuitry is configured to monitor an undervoltage condition of the output voltage and to temporarily disable the monitoring of the undervoltage condition responsive to the termination of the varying of the frequency and the duty cycle of the signal of the soft start procedure.

9. The voltage regulator of claim 1 wherein the circuitry is configured to vary the frequency and the duty cycle to provide the output voltage comprising a substantially linear ramp during the soft start procedure.

10. The voltage regulator of claim 1 wherein the circuitry is configured to monitor for the presence of excessive currents intermediate an input and an output and to adjust the signal responsive to the monitoring.

11. A controller comprising:
processing circuitry configured to provide a pulse width modulation control signal to a switch of a voltage regulator to implement voltage regulation from an initial voltage to a regulated voltage different than the initial voltage during a voltage regulation mode of operation of the voltage regulator, and to vary the frequency and the duty cycle of the pulse width modulation control signal during a soft start mode of operation of the voltage regulator.

12. The controller of claim 11 wherein the processing circuitry is configured to maintain at least one of the frequency and the duty cycle of the pulse width modulation control signal constant during the voltage regulation mode of operation.

13. The controller of claim 11 wherein the processing circuitry is configured to monitor a voltage of electrical energy outputted from the voltage regulator and to switch from the soft start mode of operation to the voltage regulation mode of operation responsive to the monitoring.

14. The controller of claim 11 wherein the processing circuitry is configured to vary the frequency and the duty cycle according to a plurality of discrete steps during the soft start mode of operation, and to sequentially proceed through the discrete steps responsive to the regulated voltage not being at a desired regulated voltage.

15. The controller of claim 11 wherein the processing circuitry is configured to monitor an undervoltage condition of the regulated voltage during the voltage regulation mode of operation, and to temporarily disable the monitoring of the undervoltage condition during a switch from the soft start mode of operation to the voltage regulation mode of operation.

16. An imaging device comprising:
an electrical load configured to use electrical energy regulated at a desired voltage used in forming an image upon media;
a voltage regulator comprising:
an input configured to receive electrical energy from a supply at an initial voltage different than the desired voltage;
an output configured to provide the received electrical energy at the desired voltage to the electrical load;
a switch configured to selectively conduct the electrical energy from the input to the output; and
processor configured to generate and provide a pulse width modulation control signal to the switch to control the voltage regulation of the electrical energy at the initial voltage to the electrical energy at the desired voltage, wherein the processor is configured to initiate regulation of the electrical energy having the initial voltage comprising adjusting a duty cycle and a frequency of the pulse width modulation control signal.

17. The device of claim 16 wherein the processor adjusts the duty cycle and the frequency of the pulse width modulation control signal during a soft start mode of operation.

18. The device of claim 16 wherein the processor is configured to maintain at least one of the frequency and the duty cycle constant after the soft start mode of operation and during a voltage regulation mode of operation.

19. A voltage regulator comprising:
means for switching to selectively conduct electrical energy according to a signal; and
means for providing the signal to implement a soft start procedure comprising varying frequency and duty cycle of the signal.

20. The regulator of claim 19 wherein the means for providing the signal comprises means for monitoring an output voltage with respect to a desired regulation range, for monitoring the output voltage with respect to an undervoltage condition, and for temporarily disabling the monitoring of the output voltage with respect to the undervoltage condition responsive to detection of the output voltage being within the desired regulation range.

21. The regulator of claim 19 wherein the means for providing the signal comprises means for providing a pulse width modulation control signal.

22. A voltage regulation method comprising:
adjusting a frequency and a duty cycle of a signal configured to control a switch to implement voltage regulation of electrical energy during a soft start procedure.

23. The method of claim 22 further comprising maintaining the frequency and the duty cycle of the signal constant responsive to voltage regulation being achieved.

24. The method of claim 22 further comprising monitoring an undervoltage condition of the electrical energy and temporarily disabling the monitoring responsive to voltage regulation being achieved.

25. The method of claim 22 wherein the adjusting comprises adjusting responsive to frequency and duty cycle values of a plurality of discrete steps, and further comprising proceeding from one of the discrete steps to an other of the discrete steps responsive to voltage regulation not being achieved.

26. The method of claim 25 further comprising ceasing the soft start procedure responsive to voltage regulation being achieved.

27. The method of claim 25 wherein the signal comprises a pulse width modulation signal.

28. The method of claim 25 wherein the proceeding provides an increase of one of the frequency and the duty cycle and a decrease of an other of the frequency and the duty cycle.

29. The method of claim 22 wherein the adjusting comprises increasing the frequency and the duty cycle of the signal.

30. The method of claim 22 wherein the adjusting provides an output voltage of a substantially linear ramp during the soft start procedure.

31. A voltage regulation soft start method comprising:
receiving an indication to initiate voltage regulation;
outputting a pulse width modulation control signal to a switch of a voltage regulator to implement voltage regulation after the receiving; and varying a frequency of the pulse width modulation control signal during the outputting.

32. The method of claim 31 wherein the varyings comprise varyings to provide an output voltage of a substantially linear ramp during the soft start procedure.

33. The method of claim 31 further comprising monitoring whether voltage regulation has been achieved responsive to the varyings, and further varying the frequency responsive to voltage regulation not being achieved during the soft start method.

34. The method of claim 31 wherein the varyings comprise selectively increasing the frequency and decreasing the duty cycle.

35. The method of claim 31 further comprising monitoring whether voltage regulation has been achieved responsive to the varyings, and further comprising disabling the varyings responsive to voltage regulation being achieved.

36. The method of claim 31 further comprising terminating the soft start method responsive to achieving desired voltage regulation.

37. The voltage regulator of claim 1 wherein the circuitry is configured to provide the signal to implement the soft start procedure between initiation of voltage regulation operations of the voltage regulator at an initial moment in time and a subsequent moment in time when a desired voltage of the voltage regulator is achieved with respect to a given load in a given application.

38. The controller of claim 11 wherein the processing circuitry is configured to vary the frequency and the duty cycle of the pulse width modulation control signal during the soft start mode of operation between initiation of voltage regulation operations of the voltage regulator at an initial moment in time and a subsequent moment in time when a desired voltage of the voltage regulator is achieved with respect to a given load in a given application.

39. The device of claim 16 wherein the imaging device comprises a printing device and the electrical load comprises a component of the printing device configured to perform an operation with respect to forming the image upon media.

40. The device of claim 16 wherein the processor adjusts the duty cycle and frequency of the pulse width modulation control signal during a soft start mode of operation between initiation of voltage regulation operations of the voltage regulator and a moment in time when the desired voltage of the voltage regulator is achieved with respect to a given load in a given application.

41. The device of claim 16 wherein the processor is configured to adjust the frequency of the pulse width modulation control signal at moments time after the initiating the regulation of the electrical energy and prior to achieving the desired voltage.

42. The method of claim 22 wherein the adjusting comprises adjusting the frequency of the signal during the soft start procedure between initiation of voltage regulation operations at an initial moment in time and a subsequent moment in time when a desired voltage is achieved with respect to a given load in a given application.

43. The method of claim 31 wherein the varying the frequency comprises varying during a soft start procedure.

44. The method of claim 43 wherein the varying the frequency comprises varying during the soft start procedure between initiation of voltage regulation operations at an initial moment in time and a subsequent moment in time when a desired voltage is achieved with respect to a given load in a given application.

45. The voltage regulator of claim 1 wherein the circuitry varies the frequency of the signal during the soft start procedure.

46. The voltage regulator of claim 45 wherein the circuitry provides the signal to implement the soft start procedure between initiation of voltage regulation operations of the voltage regulator at an initial moment in time and a subsequent moment in time when a desired voltage of the voltage regulator is achieved, wherein the circuitry varies the frequency of the signal during the soft start procedure for a single condition of use of the voltage regulator.

47. The voltage regulator of claim 1 wherein the circuitry varies the frequency of the signal during the soft start procedure for a single condition of use of the voltage regulator.

48. The voltage regulator of claim 37 wherein the circuitry varies the frequency of the signal during the soft start procedure to perform the soft start procedure.

49. The regulator of claim 19 wherein the means for providing the signal comprises means for varying the frequency of the signal during the soft start procedure.

50. The method of claim 22 wherein the adjusting comprises adjusting the frequency of the signal during the soft start procedure between initiation of voltage regulation operations at an initial moment in time and a subsequent moment in time when a desired voltage is achieved, wherein the adjusting comprises adjusting the frequency of the signal during the soft start procedure for a single condition of use of the voltage regulation method.

51. The method of claim 22 wherein the adjusting comprises adjusting the frequency of the signal during the soft start procedure for a single condition of use of the voltage regulation method.

52. The method of claim 43 further comprising varying a duty cycle of the pulse width modulation control signal during the outputting.

53. The method of claim 43 wherein the varying the frequency comprises varying during the soft start procedure between initiation of voltage regulation operations at an initial moment in time and a subsequent moment in time when a desired voltage is achieved, wherein the varying comprises varying the frequency during the soft start procedure for a single condition of use of the voltage regulation soft start method.

54. The voltage regulator of claim 1 wherein the frequency of the signal has different values and the duty cycle of the signal has different values at different moments in time during the soft start procedure.

55. The controller of claim 11 wherein the frequency of the pulse width modulation control signal has different values and the duty cycle of the pulse width modulation control signal has different values at different moments in time during the soft start mode of operation.

56. The device of claim 16 wherein the frequency of the pulse width modulation control signal has different values and the duty cycle of the pulse width modulation control signal has different values at different moments in time during a soft start procedure following the initiation of regulation of the electrical energy.

57. The voltage regulator of claim 19 wherein the frequency of the signal has different values and the duty cycle of the signal has different values at different moments in time during the soft start procedure.

58. The method of claim 22 wherein the frequency of the signal has different values and the duty cycle of the signal has different values at different moments in time during the soft start procedure.

59. The method of claim 31 wherein the frequency of the pulse width modulation control signal has different values and a duty cycle of the pulse width modulation control signal has different values at different moments in time during the method comprising a soft start procedure of the voltage regulator.

* * * * *